(12) United States Patent
Shajaan et al.

(10) Patent No.: US 8,542,847 B2
(45) Date of Patent: Sep. 24, 2013

(54) CONTROLLED OVERLAP DRIVER CIRCUIT

(75) Inventors: Mohammad Shajaan, Værløse (DK); Henrik Thomsen, Holte (DK)

(73) Assignee: Analog Devices A/S, Allerod (DK)

( * ) Notice: Subject to any disclaimer, the term of this patent is extended or adjusted under 35 U.S.C. 154(b) by 162 days.

(21) Appl. No.: 13/054,447

(22) PCT Filed: May 14, 2009

(86) PCT No.: PCT/EP2009/055826
§ 371 (c)(1),
(2), (4) Date: Mar. 31, 2011

(87) PCT Pub. No.: WO2010/006826
PCT Pub. Date: Jan. 21, 2010

(65) Prior Publication Data
US 2011/0182446 A1    Jul. 28, 2011

Related U.S. Application Data

(60) Provisional application No. 61/082,004, filed on Jul. 18, 2008.

(30) Foreign Application Priority Data

Jul. 17, 2008  (DK) .................................. 2008 01013

(51) Int. Cl.
*H04R 3/00*   (2006.01)
*H02B 1/00*   (2006.01)
*H03B 1/00*   (2006.01)
*H03K 17/56*  (2006.01)

(52) U.S. Cl.
USPC ............ 381/111; 381/123; 327/108; 327/423

(58) Field of Classification Search
USPC . 381/111, 116, 117, 120, 123; 327/108–112, 327/423; 330/10, 251, 207 A
See application file for complete search history.

(56) References Cited

U.S. PATENT DOCUMENTS

| 6,704,818 | B1 | 3/2004  | Martin et al.   |
|-----------|----|---------|-----------------|
| 7,068,097 | B2 | 6/2006  | Atmur           |
| 7,279,973 | B1 | 10/2007 | Sevenhans et al.|
| 2002/0075049 | A1 | 6/2002  | Yokoyama et al. |
| 2005/0258889 | A1 | 11/2005 | Tolle et al.    |
| 2006/0132234 | A1 | 6/2006  | Nguyen          |
| 2006/0208774 | A1 | 9/2006  | Leonowich       |
| 2007/0164815 | A1 | 7/2007  | Lee             |

FOREIGN PATENT DOCUMENTS

| EP | 0 599 631 A1 | 6/1994  |
|----|--------------|---------|
| JP | 60-257624    | 12/1985 |
| JP | 2004-208442  | 7/2004  |

OTHER PUBLICATIONS

Choy, C.S. et al., "A Feedback Control Circuit Design Technique to Suppress Power Noise in High Speed Output Driver", IEEE International Symposium on Circuits and Systems, 1995, pp. 307-310.
Danish Patent and Trademark Office, Nyhedsundersogelsesrapport, Search Report for Danish patent application No. PA 2008 01013, Feb. 23, 2009.

(Continued)

*Primary Examiner* — Tuan D Nguyen
(74) *Attorney, Agent, or Firm* — Kenyon & Kenyon LLP

(57) ABSTRACT

The present invention relates to a driver circuit wherein upper and lower legs of a first driver comprise first and second sets of parellelly coupled semiconductor switches, respectively. A control circuit is configured to generate respective control signals for the first and second sets of parellelly coupled semiconductor switches to create a current path through the upper and lower legs during an overlap time period between state transitions of a driver output.

19 Claims, 10 Drawing Sheets

(56) References Cited

OTHER PUBLICATIONS

European Patent Office, International Type Search Report for Danish patent application No. PA 2008 01013, Sep. 30, 2008.

European Patent Office, International Search Report for International application No. PCT/EP2009/055826, Aug. 5, 2009.

European Patent Office, Written Opinion of the International Searching Authority for International application No. PCT/EP2009/055826, Aug. 5, 2009.

CONTROLLED OVERLAP DRIVER CIRCUIT

CROSS-REFERENCE TO RELATED APPLICATIONS

This application is a 35 U.S.C. §371 National Phase of International Application No. PCT/EP2009/055826 filed on May 14, 2009, which is herein incorporated by reference in its entirety and which claims priority to Danish Application No. PA 2008 01013 filed on Jul. 17, 2008 and to U.S. Provisional Application No. 61/082,004 filed on Jul. 18, 2008, both of which are herein incorporated by reference in their entireties.

The present invention relates to a driver circuit wherein upper and lower legs of a first driver comprise first and second sets of parellelly coupled semiconductor switches, respectively. A control circuit is configured to generate respective control signals for the first and second sets of parellelly coupled semiconductor switches to create a current path through the upper and lower legs during an overlap time period between state transitions of a driver output. The present driver circuit is particularly well-suited for applications intended for driving electrical loads with substantial inductive components.

BACKGROUND OF THE INVENTION

Driver circuits for supplying drive voltage and current to an electrical load like a loudspeaker or a motor are known in the art. These driver circuits are coupled to a pair of power supply voltages to deliver signal or d125 ive power to the electrical load for example in form of audio signals. An H-bridge driver is a popular type of driver circuit which comprises two essentially identical drivers or half-bridges—denoted a left half-bridge and a right half-bridge. In each half-bridge, an upper leg or upper section comprises one or more semiconductor switches coupled to the positive power supply voltage while another leg is coupled to the negative power supply voltage and is designated a lower leg or section. A circuit node established in-between the upper and lower legs is designated a driver output to which the electrical load or load is operatively connectable. By selecting an appropriate timing scheme of control signals applied to respective control inputs of the semiconductor switches of the upper and lower legs of the driver circuit, the driver output toggles between at least two output states to create AC signal voltage swing across the load.

A semiconductor switch comprises at least one control terminal or input and two switch terminals between which an electrical resistance can be controlled in response to a control signal at the control input. When a semiconductor switch is in an 'on state' or 'closed state' a resistance between the two switch terminals is a relatively low while the resistance is relatively high (relative to the closed state) when the switch is in its 'off state' or 'open state' or simply off.

The respective control signals may be generated by an appropriate control circuit. For instance when the driver circuit is utilized as a load driver in a class-D amplifier, the respective control signals are usually of the digital type, turning the semiconductor switches either fully on, i.e. in a closed state, or fully off, i.e. in an open state; naturally, with a short transition period in between. Several functional variants of H-bridge drivers are known in the art, for example having two or three output states and one transitional state. In a two state H-bridge driver, output states of each driver output is toggled between the positive and negative power supply voltage in accordance with a particular drive signal. The drive signal may be PWM or PDM modulated drive signal. In a three state, or three level, H-bridge driver, output states of the pair of driver outputs may be toggled between the positive power supply voltage, the negative supply voltage and an high-impedance state/tristate or a zero-state where both driver outputs are pulled to the positive supply voltage or both pulled to the negative supply voltage.

In traditional driver circuits, a short time interval of so-called blanking time has often been introduced in connection with a state transition of the driver output. During the blanking time a semiconductor switch of the upper leg and a semiconductor switch of the lower leg are both placed in respective open states. During the blanking time, the load floats relative to the power supply voltages. This means the driver output, and consequently the load, is not actively pulled towards one of the power supply voltages due to the open states of the upper and lower legs.

The blanking time is introduced to avoid unnecessary power dissipation in the semiconductor switches of the upper and lower legs by short-circuiting the power supply directly by a current path formed through the upper leg and the lower leg. In absence of the blanking time, semiconductor process variations and temperature dependent variations in the relative timing between control signals driving the semiconductor switches of the upper leg and the control signals driving the semiconductor switch of the lower leg can form an unintended state where the respective semiconductor switches of the upper and lower legs are simultaneously closed.

This short-circuiting of the power supply during an unintended overlap state will often lead to significant power dissipation because the respective on-resistances of the semiconductor switches of the upper and the lower legs in their closed states are very low. The low on-resistance is on the other hand necessary, or at least advantageous, because electrical characteristics of the load in combination with the electrical characteristics of the semiconductor switches play an important role for the performance of the driver circuit. The upper and lower legs are designed with on-resistances that are much smaller than an ohmic resistance of the load such that output signal power primarily is dissipated in the load and only to a much smaller extent dissipated in the semiconductor switch(es) as power loss.

Typically, the on-resistance in a leg of a driver circuit designed for driving a 4-8 Ohms loudspeaker load is set to value in a range between of 0.1 and 0.5 Ohms depending on a desired efficiency. Typically, the off-resistance of the upper or lower leg is very large; that is, in order of MΩ or GΩ.

Generally, the load has an impedance that can be modelled with a network of ohmic, inductive and capacitive components. Load impedances presented by components such as loudspeakers and motors are dominated by an inductive behaviour and ohmic resistance.

Two square-wave drive signals at a predetermined switching frequency are conventionally applied as respective control signals to drive the upper and lower legs of the driver. When the switching frequency of the square-wave drive signal is relatively high compared to an inverse time constant of the load and the load impedance has a significant inductive component, the driver will change the load current in small quanta for each period of the switching frequency.

This fact leads to a number of unsolved problems in the previously described traditional driver circuits, including H-bridge drivers that utilize blanking time in connection with a state transition of a driver output. Immediately before the blanking period or time begins, load current in an H-bridge driver is flowing through the load either from left to right or vice versa in because the semiconductor switches are in their closed states to supply load current/power to the load. The path where this load current is flowing is subsequently abruptly opened or disconnected when the respective semiconductor switches are set to their respective open states in connection with the start of the blanking period. Thus, immediately after the blanking time has begun, the load current continues to flow as immediately before the start of the blanking time because the inductive component of the load attempts to retain the flow of load current despite the respective semiconductor switches of the upper and lower legs being opened or off. In turn, large voltage spikes are generated across the load and these tend to stress the semiconductor switches and degrade their reliability.

Furthermore, in case the semiconductor switches of the driver are implemented as CMOS transistors a parasitic diode junction is inevitably established when such a load current is supplied out of a drain terminal of a NMOS/PMOS transistor or into a drain terminal of the NMOS/PMOS transistor. Depending on a direction of the load current immediately before start of the blanking time, a voltage spike is generated either across a parasitic substrate diode of the lower CMOS transistor or across a parasitic substrate diode of the upper CMOS transistor. This voltage spike will shift the voltage on the driver output to a level either above the positive power supply voltage or a level below the negative power supply voltage.

Thus for CMOS based driver circuits, the disruption of an established flow of load current in connection with the blanking time causes the parasitic substrate diode between the transistors' source and drain terminal to conduct and induce a voltage drop across the parasitic substrate diode. This voltage drop will shift the voltage level at the driver output connected to the load to a potential approximately 0.7 Volts above the positive supply (assuming that ohmic resistance associated with the parasitic diode is negligible). Alternatively, this voltage drop will shift the voltage level at the driver output to a potential approximately 0.7 Volts below the negative supply. For several reasons this is undesired. Since disrupting the loop where load current is flowing through an inductive impedance, a substantial voltage spike or peak is generated. Such voltage spikes will occur every time the respective semiconductor switch of an upper and a lower leg are opened simultaneously. This phenomenon causes Electromagnetic Interference (EMI) noise because the voltage spikes are superimposed on the power supply voltages or rails. Further, an excessive amount of power is dissipated in the semiconductor switches due to the voltage spikes caused by the substrate currents. This reduces efficiency of the driver circuit. In addition CMOS transistors are not designed for conducting such substrate currents through the associated parasitic diode so this may stress the CMOS transistors, i.e. semiconductor switches, and degrade their reliability.

Another problem associated with the above-discussed the voltage spikes is that the power supply voltage to the driver circuit must be set to a lower DC voltage than otherwise possible to ensure compliance with absolute maximum voltage ratings of the semiconductor process in question taking the voltage spikes into account. The lowered DC voltage to the driver circuit is a safety margin needed due to the expected power supply voltage overshoots or undershoots. Since the maximum load signal voltage and thus signal power in the load is approximately proportional to the power supply voltage raised to a power of two, the required safety margin significantly limits the maximum output power of the driver circuit.

Finally, in numerous applications it is desirable to generate an analogue signal voltage with low distortion across the load. Such analogue signals are often generated by letting an inductive component of a load impedance act as a low-pass filter on a Class-D modulated driver output signal to attenuate switching frequency components remaining from the switching frequency of the class-D modulation. In this type of application, the voltage spikes caused by the disruption of the current patent during the blanking time may introduce a substantial amount of distortion in the analogue signal voltage across the load.

RELATED ART

US 2006/0208774 discloses an H-bridge driver circuit coupled to a load. The H-bridge driver circuit comprises four legs which each comprises a plurality of parellelly coupled controllable MOS semiconductor switches. Individual control inputs, i.e. gate terminals, of the MOS semiconductor switches in a leg are separately driven by respective control signals generated by a drive or control circuit. The control signals are well-defined delayed replicas of each other and serve to selectively turn-on the controllable MOS transistors of a particular leg in a staggered fashion.

The IEEE publication "A feedback control circuit design technique to suppress power noise in high speed output drivers" (Choy) discloses an output driver with feedback controlled slew-rate. One output driver design comprises two legs which each comprises three parellelly coupled controllable MOS semiconductor switches. Individual inputs, i.e. gate terminals, of the MOS transistors of a leg, are separately driven by respective control signals generated by an inverter chain drive circuit.

U.S. Pat. No. 7,279,973 discloses an H-bridge circuit coupled to an inductive load. Circuit nodes connected to the inductive load can be held on one or more intermediates voltages for a period of time in the midst of a switching operation. The intermediates voltages are set relative to the power supply rails of the H-bridge circuit.

U.S. Pat. No. 7,068,097 discloses a control system for scaling the pulse-width-modulated (PWM) frequency output of a power amplifier connected to a load. The control system includes a drive assembly configured as an H-bridge structure electrically connected to the load. The drive assembly is configured as a number of half-bridge assembly groupings, with each half-bridge assembly in a grouping containing switching elements having a maximum individual operating frequency. The switching elements are controlled by a processor that provides time sliced commands in a manner that enables the composite output signal frequency from the half-bridge assembly grouping to be greater than the maximum operating frequency of an individual switching element. Typically, the control system is configured such that the composite output frequency is equal to the product of the individual switching element operating frequency and the number of half-bridge assemblies in a grouping electrically connected to the load.

SUMMARY OF THE INVENTION

According to a first aspect of the invention, there is provided a driver circuit which comprises a first driver comprising an upper leg coupled between a first power supply voltage and a first driver output. A lower leg of the first driver is coupled between the first driver output and a second power supply voltage. The upper leg comprises a first set of parellelly coupled semiconductor switches controlled by respective control signals of a first set of control signals and the lower leg comprises a second set of parellelly coupled semiconductor switches controlled by respective control signals of a second set of control signals. A control circuit is configured to generate the first and second sets of control signals for the first and second sets of parellelly coupled semiconductor switches, respectively, to create a current path through the upper and lower legs during an overlap time period between state transitions of the first driver output.

The current path preferably comprises a subset of the first and/or the second set of parellelly coupled semiconductor switches.

According to one embodiment of the invention, the current path comprises alternating subsets of the first and second sets of parellelly coupled semiconductor switches in accordance with state transitions of the first driver output so that only semiconductor switches of a single subset is closed during each state transition of the first driver output.

In an alternative embodiment the current path comprises a subset of the first set of parellelly coupled semiconductor switches and a subset of the second set of parellelly coupled semiconductor switches for each state transition of the first driver output.

Each of the first and second sets of parellelly coupled semiconductor switches comprises two or more parellelly coupled semiconductor switches. A subset of the first or the second set of parellelly coupled semiconductor switches or subset may be formed by a single semiconductor switch or by several of the relevant set of parellelly coupled semiconductor switches.

For example, the subset of the first set of parellelly coupled semiconductor switches may be closed during the overlap time period where the first driver output makes an output state transition from logic "high" to logic "low" level and the second set of parellelly coupled semiconductor switches is set to a closed state. The logic "high" and "low" levels may for example correspond essentially to the first and second power supply voltages, respectively, such as a positive supply voltage and a negative supply voltage. The negative supply voltage may for example be set to ground (GND) potential or a negative DC voltage below ground potential. A current path, or cross-conduction path, is formed between the first and second power supply voltages during the overlap time period for example because the semiconductor switches of at least one subset are placed in closed states simultaneously with the first or the second set of parellelly coupled semiconductor switches is set to a closed state.

In the prior art, great care has traditionally been taken of avoid any formation of a current path through the upper and lower legs of a driver by introducing the previously described blanking time in-between state transitions of the driver output where semiconductor switches of the upper and lower legs were open simultaneously in the blanking time. However, in accordance with the present invention, the current path formed during the overlap time period includes a single or both subset(s) of the first or second sets of parellelly coupled semiconductor switches. This has the effect that the resistance or impedance of the formed current path may be may be much larger than a current path formed by having the first and second sets of parellelly coupled semiconductor switches set to respective closed states simultaneously. Furthermore, because the on-resistance of the current path is dominated by the selected subset(s) of semiconductor switches (assuming the on-resistance of the subset is significantly smaller than the on-resistance of the corresponding leg) the on-resistance is reasonably well-controlled and predictable, i.e. not dominated by semiconductor wafer processing parameters such as timing skew between control signals to the upper and lower legs of the driver.

According to a preferred embodiment of the invention, on-resistance of the subset of the first set of parellelly coupled semiconductor switches, or first set of semiconductor switches is set to between 1 and 30%, preferably between 5 and 20% such as around 10%, of the on-resistance of the first set of semiconductor switches and likewise for an on-resistance of the subset of the second set of parellelly coupled semiconductor switches, or second set of semiconductor switches, relative to an on-resistance of the second set of parellelly coupled semiconductor switches. The on-resistance of one or both of the subsets is accordingly significantly larger than the on-resistance of a set of semiconductor switches forming the corresponding leg for example more than 3 times larger or more than 10 times larger.

Each of the first and second sets of parellelly coupled semiconductor switches comprises a plurality of semiconductor switches for example between 2 and 100, or more preferably between 4 and 20, individual semiconductor switches. The individual semiconductor switches of a particular leg may all have essentially identical on-resistance (under same operating conditions) so that the on-resistance of a subset during the overlap time period represents an integer fraction of the on-resistance of the set of semiconductor switches of the leg in question.

Alternatively, each of the first and second sets of semiconductor switches may be formed by as little as 2 parellelly coupled semiconductor switches, i.e. a switch pair, in which a single semiconductor switch constitutes the subset of the leg in question. The semiconductor switch which constitutes the subset may posses an on-resistance that is significantly larger than the on-resistance of the other semiconductor switch of the pair of semiconductor switches, for example as previously-mentioned between 4 and 100 times larger by suitable selection of dimensions or types of the two semiconductor switches.

According to a particularly advantageous embodiment of the invention, the first set of parellelly coupled semiconductor switches comprises two or more semiconductor switches with binary weighted on-resistances such as between 3 and 9 semiconductor switches with binary weighted on-resistances; and/or the second set of semiconductor switches comprises two or more semiconductor switches with binary weighted on-resistances such as such as between 3 and 9 semiconductor switches with binary weighted on-resistances. The set of binary weighted semiconductor switches are conveniently manufactured in CMOS processes by appropriate scaling of relative dimensions between the individual semiconductor switches. The binary weighted on-resistances provide the control circuit with an effective mechanism for very accurately setting the on-resistance, or respective on-resistances, of the upper and/or lower sets of semiconductor switches without requiring an impractically large number of individual control signals for each or both of the first and second sets of control signals. The same advantage applies for accurately setting the respective on-resistances of respective subsets of the first and second sets of semiconductor switches The presence of the current path through the upper and lower legs during the overlap time period eliminates many of the previously described problems associated with traditional blanking times, in particular the problems related to driving loads with inductive components or inductive loads. The formation of the current path during the overlap time period ensures that the first driver output, which is coupled to the inductive load, never enters the previously-described high-impedance or floating state in-between state transitions which floating state is the cause of the previously-mentioned voltage spikes in the load voltage waveform.

Thus by an appropriate choice of the overlap time period and/or the on-resistance of the subset of semiconductor switches in the overlap time period, the voltage spikes can be eliminated or at least attenuated and the introduced amount of short-circuit power can be accurately controlled by selection of appropriate values for the on-resistances of the subsets of semiconductor switches and the duration of the overlap time period. Consequently, the present invention is capable of solving the previously-mentioned prior art driver circuit problems with regard to limited maximum load power, EMI disturbances and circuit reliability.

According to a preferred embodiment of the invention, the control circuit is adapted generate a first set of progressively delayed control signals for the first set of semiconductor switches in the upper leg and a second set of progressively delayed control signals for the second set of semiconductor switches of the lower leg. A progressively delayed control signal is accordingly applied to individual semiconductor switches of first set of semiconductor switches so that the on-resistance of the upper leg and/or the lower leg gradually decreases over time during a current state of the first driver output.

The driver circuit may utilize different types of semiconductor switches depending on requirements of any particular application for example low voltage or high voltage application. Each of the first or second sets of semiconductor switches preferably comprises one or more transistors selected from a group of {Field Effect Transistors (FETs), Bipolar Transistors (BJTs), Insulated Gate Bipolar Transistors (IGBTs)}. A number of driver circuits targeted for driving loudspeaker loads are preferably based on CMOS semiconductor switches. The entire driver circuit is preferably integrated on a CMOS semiconductor die or substrate to provide a robust and low-cost single chip solution which is particularly well-suited for high-volume consumer oriented applications, such as mobile phones and MP3 players, where cost is an essential parameter.

According to a particularly advantageous embodiment of the invention, the driver circuit further comprises a sensor operatively coupled to sense a load current supplied through the first driver output. The control circuit is operatively coupled to the sensor and adapted to change characteristics of the respective control signals applied to the first and second sets of semiconductor switches in accordance with sensed values of the load current. This driver circuit embodiment comprises an adaptive mechanism for controlling important performance related parameters of the driver circuit, for example the on-resistance of one or both subset(s) of semiconductor switches during the overlap time period, in dependence on the load current. The on-resistances of the subsets may for example be controlled by altering the number of semiconductor switches that forms the subset of the first set of semiconductor switches; and/or altering a number of semiconductor switches of the subset of the second set of semiconductor switches. The on-resistance of a subset is preferably controlled according to a scheme where the on-resistance of the subset decreases with increasing level of the load current. This scheme may for example be implemented by a control scheme which comprises gradually increasing the number of closed semiconductor switches of a subset as the dynamic load current increases and vice versa. An advantage of this control scheme is that the resistance of the current path depends on the load current so as to suppress or eliminate the voltage spikes. The on-resistance of a subset is high when the load current is small and the magnitude of the induced voltage spikes therefore relatively small. The high resistance of the current path under small load current conditions reduces power waste in form of short circuit power. In audio, in particular digital audio, applications of the present driver circuit, the control circuit is preferably adapted to sense the load current in at least a portion of an audio frequency range between 20 Hz and 20 kHz such as between 200 Hz and 2 kHz. This ensures that the adaptive control of the respective control signals can be based on a level of audio current in the load, e.g. an electrodynamic loudspeaker.

In addition to, or alternatively to, adaptively controlling the on-resistance of the subsets as described above, the control circuit may be adapted to change a duration of the overlap time period. This can for example be effected by changing the relative timing between the control signal(s) applied to the semiconductor switches of a subset and the control signals applied to the first or second sets of semiconductor switches, as the case may be.

The on-resistance of a semiconductor device is determined by its process of manufacture and its geometry. For semiconductor switches implemented as CMOS transistors the relevant geometrical parameter is the width-to-length (W/L) ratio of the CMOS transistor. PMOS transistors of CMOS semiconductor processes generally exhibit an on-resistance which is 2-3 times larger than an on-resistance of a NMOS transistor with similar dimensions and manufactured in the same semiconductor process.

An advantageous embodiment of the invention comprises two essentially identical drivers which jointly form an H-bridge. Accordingly, an H-bridge driver circuit comprises a second driver comprising an upper leg coupled between the first power supply voltage and a second driver output and a lower leg coupled between the first driver output and the second power supply voltage. The upper leg comprises a third set of parellelly coupled semiconductor switches controlled by respective control signals supplied by the control circuit and the lower leg comprises a fourth set of parellelly coupled semiconductor switches controlled by respective control signals supplied by the control circuit. The control circuit is therefore further adapted to generate the respective control signals for the third and fourth sets of parellelly coupled semiconductor switches to create a current path through the upper and lower legs during an overlap time period between state transitions of the second driver output. The second driver may of course include any one or any combination of the individual features described in connection with embodiments of the first driver described above.

The load is connectable in-between the first and second driver outputs of the H-bridge driver circuit. In an embodiment where the H-bridge driver is configured as a two output state design, the respective control signals applied to the third set of parellelly coupled semiconductor switches and the respective control signals applied to the first set of parellelly coupled semiconductor switches are substantially 180 degrees out of phase at all times. The same phase relationship applies for the respective control signals applied to the second and fourth sets of parellelly coupled semiconductor switches which means the first and second driver outputs are operating 180 degrees out of phase so as to continuously reverse the polarity of the voltage across the load.

The driver circuit may be adapted to operate on a wide range of DC supply voltages, i.e. a voltage difference between the first and second power supply voltages, depending on characteristics of a particular application. In a range of useful applications, the DC supply voltage may be set to value between 1.8 Volt and 5.0 Volt. The DC supply voltage may be provided as a unipolar or bipolar DC voltage for example +/−2.5 Volt relative to a ground reference.

In an embodiment of the invention, the control circuit comprises a Digital Signal Processor (DSP) for example in form of a software programmable DSP or a hardwired customized DSP based on an ASIC or an appropriately configured Field Programmable Logic Array (FPGA). The respective control signals for the sets of semiconductor switches may be generated by a suitable DSP program/algorithm and applied directly to individual semiconductor switches. In a number of applications, the driver circuit may comprise a class-D modulated signal with a predetermined switching frequency between 100 kHz and 10 MHz. In this embodiment, the first and second driver outputs may apply a pulse-width modulation (PWM) or pulse-density modulation (PDM) modulated signal to the load. The DSP may therefore comprise a PWM or PDM modulator adapted to modulate a digital audio signal or a motor drive signal. The digital audio signal may be a recorded audio signal provided through e.g. a MP3 player or CD player or a processed digitized microphone signal generated inside a portable terminal such as a mobile phone.

A second aspect of the invention therefore relates to a sound reproducing assembly which comprises a digital audio signal generator and a PWM or PDM modulator operatively coupled to the digital audio signal generator. The PWM or PDM modulator is adapted to provide modulated digital signals. A control circuit portion of a driver circuit according to any of the above-described embodiments is operatively coupled for receipt of the modulated digital signals. An electroacoustical loudspeaker is electrically coupled to the first driver output and a reference potential such as one of the first and second power supply voltages, or electrically coupled in-between the first driver output and the second driver output.

In one embodiment of the present driver circuit the control circuit is fed by a master clock signal generated by a master clock generator. The first and second sets of control signals for the first and second sets of semiconductor switches, respectively, are derived synchronously from the master clock signal to provide first and second sets of control signals where the individual control signals of each set of control signals are synchronous to each other. Thereby a duration of the overlap time period is set by control signals that synchronous relative to the master clock.

According to an alternative, and preferred, embodiment the first and second sets of control signals for the first and second sets of semiconductor switches, respectively, are derived in an asynchronous manner by combinational logic and logic gates from the master clock signal or any other clock signal of the control circuit. The first and second sets of control signals can be generated with self-timed logic circuitry without any requirement for a generating and supplying a clock frequency higher than a frequency of the master clock signal. This asynchronous scheme for deriving the first and second sets of control signals reduces circuit complexity of, and reduces power consumption in, the control circuit.

BRIEF DESCRIPTION OF THE DRAWINGS

A detailed description of embodiments of the invention is given below with reference to the drawings, in which.

DETAILED DESCRIPTION OF EMBODIMENTS OF THE INVENTION

Figure 1:
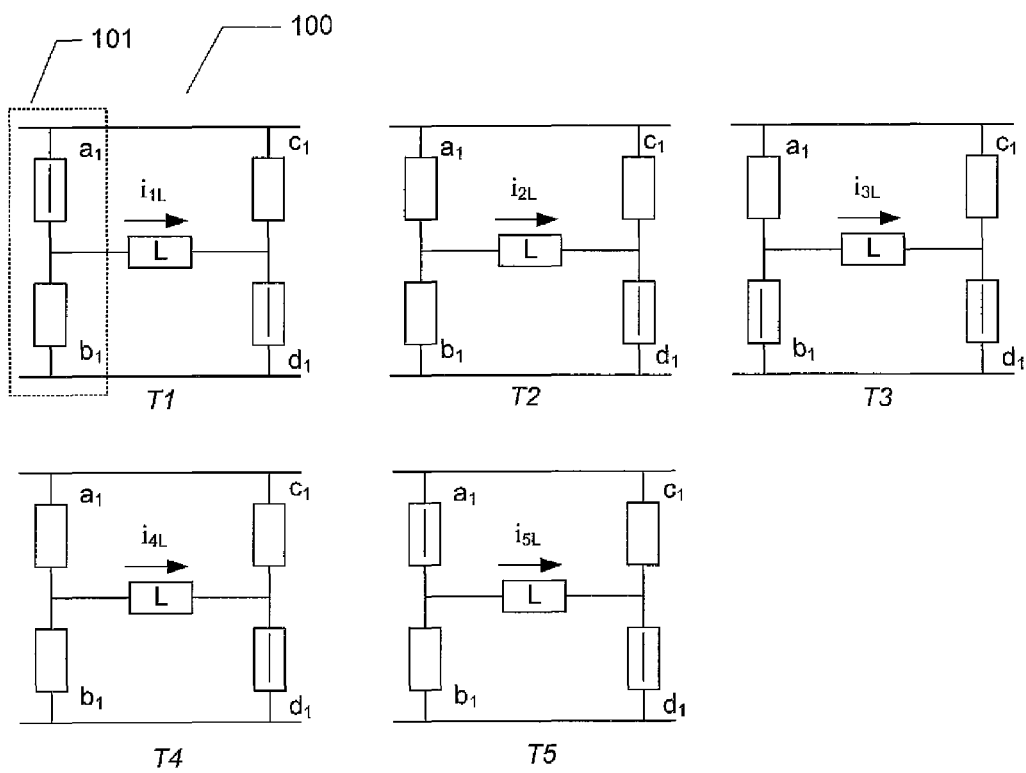
FIG. 1 illustrates schematically a timing sequence for the switching of individual legs of a prior art H-bridge.

FIG. 1 illustrates schematically a timing sequence for the switching of respective semiconductor switches of two legs a1 and b1 of a left half H-bridge 101 of a prior art H-bridge driver 100 in accordance with prior art timing schemes of respective control signals applied to control inputs of the semiconductor switches. The timing scheme is set so as to deliberately create an intermediate dead time or blanking time between output state transitions of each driver of the H-bridge as illustrated for the left half H-bridge 101 in connection with states T2 and T4.

Figure 2:
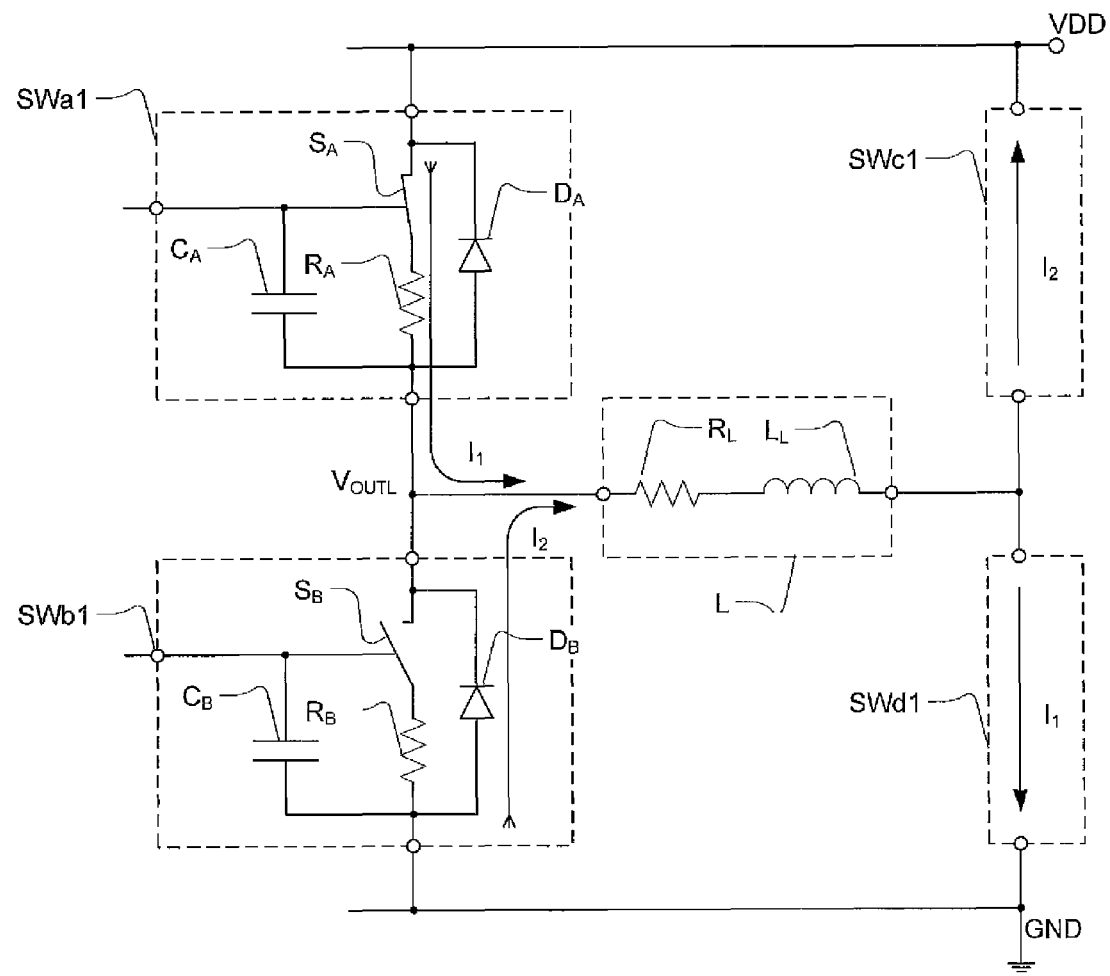
FIG. 2 depicts an electrical model of a left half H-bridge of the prior art H-bridge schematically depicted in FIG. 1.

FIG. 2 shows an electrical model of a left half H-bridge 101 of the prior art H-bridge 100 schematically depicted in FIG. 1. The driver output, $V_{OUTL}$ is coupled to the load, L, which includes a resistive component modelled by $R_L$ in series with significant inductive component modelled by inductor $L_L$. Problems related to the presence of a blanking time between output state transitions on $V_{OUTL}$ of the left driver output are explained below in an embodiment where Swa1 and Swb1 are based on CMOS transistors. The circuit model is depicted in a state, where semiconductor switch SWa1 at an immediately preceding point in time has been closed and where load current immediately before the closing of SWa1 was flowing through the load as indicated by the arrow designated $I_1$. Thus, switch SWa1 was on and switch SWd1 was on meaning that current $I_1$ was flowing from a positive supply V+ to a negative supply VDD through switch SWa1, the load L and the switch SWd1. This load current will increase in the inductor or "charge" the inductor $L_L$. The semiconductor switches SWaI is modelled by an ideal switch $S_A$ in series with a resistor, $R_A$, representing an on-resistance or $R_{ON}$ of the switch in its closed state. Typically, semiconductor switches of H-bridge drivers are designed so that their on-resistances are much less than $R_L$.

In the moment immediately following when the blanking time or period (state T2 on FIG. 1) is entered and where semiconductor switch SWa1 has been opened and semiconductor switch SWb1 is still open the load is essentially decoupled from both of the power supply voltages VDD and GND because of the high impedances of SWa1 and SWb1. However, the load current $I_1$ running through inductor $L_L$ will continue to flow due to the inductive nature or component of the load. As a consequence an alternative load current path, illustrated by current $I_2$ through a parasitic substrate diode, $D_B$, associated with the switch SWb1 is established. Consequently, a negative voltage of about 0.7 Volt is established across SWb1 which forces the driver output, $V_{OUTL}$, to undershoot with a voltage spike down-to a level of about 0.7 Volts below the level of the GND power supply voltage during the blanking time. A PN-junction of SWb1 will be exposed to this current which flows in a semiconductor substrate or die holding the H-bridge circuit and therefore induces noise.

Figure 3:
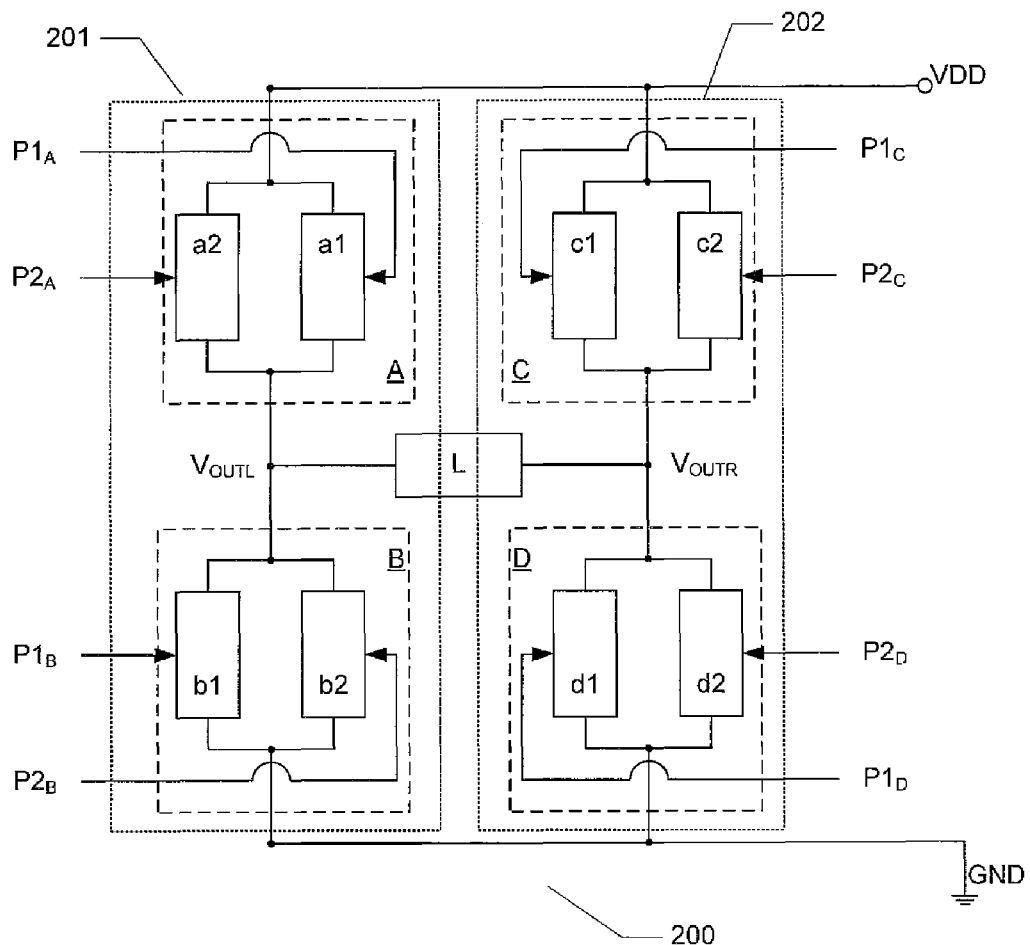
FIG. 3 depicts schematically an H-bridge with four legs A-D in accordance with a first embodiment of the invention.

FIG. 3 schematically illustrates an H-bridge 200 with four legs A-D in accordance with a first embodiment of the invention. The H-bridge comprises two essentially identical drivers or half H-bridges 201, 202 with respective sets of control inputs, $P1_A$ and $P2_A$; $P1_B$, $P2_B$ for the left half H-bridge 201 and $P1_C$, $P2_C$ and $P1_D$, $P2_D$ for the right half H-bridge 202.

A load, L, is electrically interconnected between a left and a right driver output, designated, $V_{OUTL}$ and $V_{OUTR}$, respectively. The four legs are designated A, B, C and D and each comprises a set of parellelly coupled semiconductor switches—for example embodided as CMOS transistors. Each set of parellelly coupled semiconductor switches of legs A-D is configured as two subsets of semiconductor switches with individual control inputs for receipt of respective control signals to selectively open or close the subset of semiconductor switches. For example comprises leg A two subsets $(a_1)$ and $(a_2)$ of semiconductor switches operated by control signals $P1_A$ and $P2_A$, respectively. As illustrated, legs B, C and D comprise corresponding sets and subsets of semiconductor switches in form of $(b_1)$ and $(b_2)$; $(c_1)$ and $(c_2)$; and $(d_1)$ and $(d_2)$, respectively.

The legs A and B are coupled between a positive power supply voltage, VDD, and a negative power supply voltage, GND, and constitute the left side half-H-bridge 201. Likewise, legs C and D constitute the right half H-bridge 202 also coupled between the positive power supply voltage or rail, VDD, and the negative power supply voltage or rail, GND.

Figure 4:
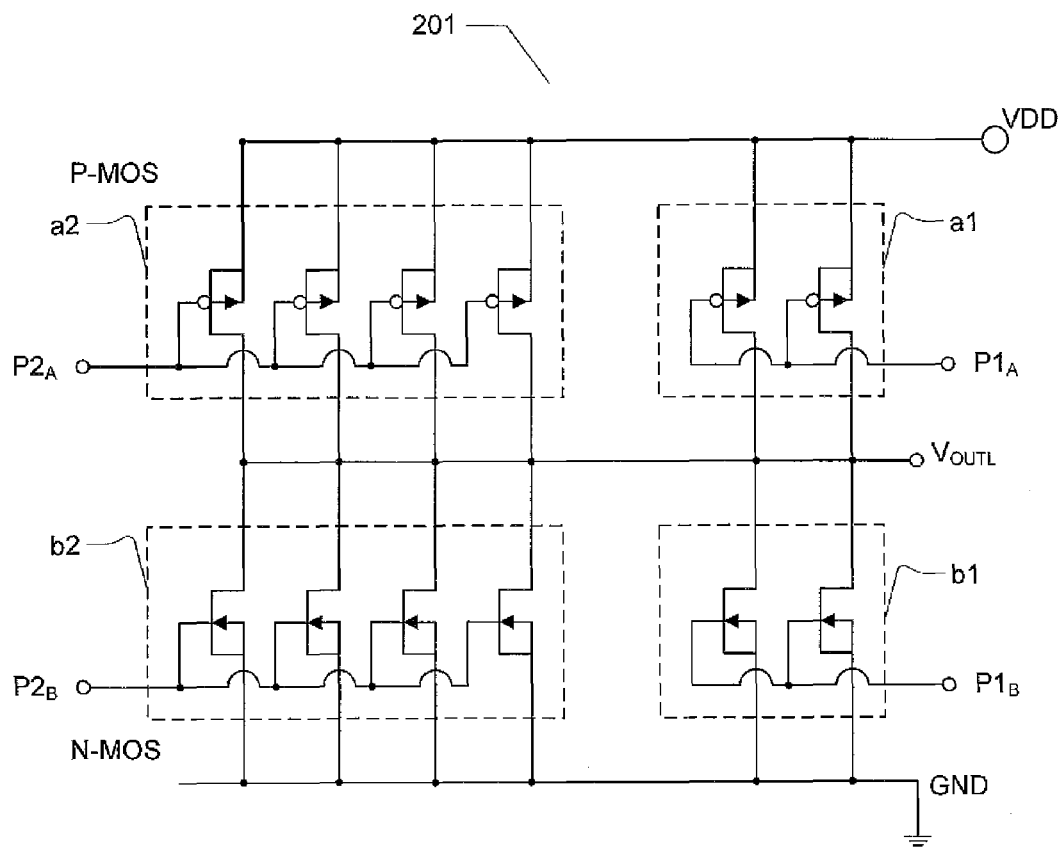
FIG. 4 is an exemplary transistor level diagram for a CMOS implantation of a half H-bridge of the H-bridge depicted in FIG. 3.

FIG. 4 is a CMOS transistor level diagram of the sets of parellelly coupled semiconductor switches $(a_1, a_2)$ and $(b_1, b_2)$ of legs A and B, respectively. In the present embodiment, each subset of semiconductor switches $(a_2)$ and $(b_2)$ comprises four parellelly coupled CMOS transistors while semiconductor switch subsets $(a_1)$ and $(b_1)$ each comprises two parellelly coupled CMOS transistors. In the present embodiment, the four parellelly coupled CMOS transistors of subset $(a_2)$ are PMOS transistors with essentially identical dimensions and the four parellelly coupled CMOS transistors of subset $(b_2)$ are NMOS transistors with essentially identical dimensions. Each NMOS transistor of subset $(b_2)$ is preferably designed with an on-resistance about similar to an on-resistance of each PMOS transistor of subset $(a_2)$, for example by using different W/L ratios for PMOS and NMOS transistors. In the present embodiment of the invention, each semiconductor switch of subsets $(a_2)$ and $(b_2)$ is designed to exhibit an on-resistance that is about one-half of an on-resistance of each semiconductor switch of subsets $(a_1)$ and $(b_1)$. Consequently, the on-resistances of subsets $(a_2)$ and $(b_2)$ is about one-fourth or 25% of the on-resistance of subsets $(a_1)$ and $(b_2)$, respectively. Stated in another way, the on-resistance of subset $(a_1)$ is about 20% of the on-resistance of the entire leg A, i.e. the set of parellelly coupled semiconductor switches $(a_1, a_2)$, in a state where all CMOS transistors of this set are closed or in on-states. Likewise, the on-resistance of subset $(b_2)$ is about one-fourth or 25% of the on-resistance the subset $(b_1)$ which again means the on-resistance of subset $(b_1)$ is about 20% of the on-resistance of the set of parellelly coupled semiconductor switches $(b_1, b_2)$ which forms leg B in a state where all CMOS transistors of leg B are closed or on.

The on-resistance of each of legs A and B, i.e. the respective sets parellelly coupled semiconductor switches $(a_1, a_2)$ and $(b_1, b_2)$, in closed state may vary significantly according to requirement of a particular application, in particular a resistance of the load. In driver circuits for electrodynamic loudspeakers the above-mentioned on-resistance may be set to a value between 0.05 and 5 ohm such as between 0.1 and 0.5 ohm. This means that the on-resistance of each of the subsets $(a_1)$ and $(b_1)$ may be set to a value in the range 0.25 to 25 ohm with the above-described selection of the ratio of on-resistance between a leg and its subset. However, other embodiments may use an on-resistance of a subset which is say about 10-100 times larger than an on-resistance of the corresponding leg.

A conventional two-level H-bridge is controlled such the set of semiconductor switches of leg A and the set of semiconductor switches of leg D are operated substantially in-phase and the sets of semiconductor switches of legs C and B are operated in-phase, but 180 degrees out of phase with the sets of semiconductor switches of section A and D. This means that the sets of semiconductor switches of legs A and D are closed at the same time and load current eventually will start flowing from the first driver output, $V_{OUTL}$, supplied from the positive power supply voltage VDD, through leg A and through the load, L, towards and through leg D to the negative power supply voltage GND. At a later point in time set by a switching frequency, the sets of semiconductor switches of legs A and D will be opened or non-conductive and—subsequently—the sets of semiconductor switches of legs C and B will be closed and eventually load current will flow from VDD through leg C and the load, L, towards GND through the closed semiconductor switches of leg B. Thus load current runs either way through the load in an alternating manner in accordance with the switching frequency of the respective control signals applied on control inputs $P1_A$ $P2_A$; $P1_B$ $P2_B$P; $P1_C$, $P2_C$ and $P1_D$, $P2_D$.

Thus, generally, when the respective sets of semiconductor switches of legs A and D are all closed, the driver output voltage $V_{OUTL}$ will be approximately equal to the positive supply voltage and the voltage across the load approximately equal to the difference between the positive and negative power supply voltages. Likewise, when the respective sets of semiconductor switches of legs C and B are all closed, the driver output voltage $V_{OUTL}$ will be approximately equal to GND or zero and the voltage across the load approximately equal to the voltage difference between the positive and negative power supply voltages, but with opposite polarity.

However, the electrical impedance of the load L and the respective on-resistances of the semiconductor switches play an important role. The load can often be characterized by an ohmic series resistance, a load inductance and a load capacitance. For loudspeaker or a motor loads the inductive component and ohmic resistance dominate tend to dominate. The semiconductor switches can be characterized by their on-resistance which varies depending on switch dimensions and process outcome. Typically, the set of semiconductor switches of one leg is configured to posses an on-resistance much smaller than the ohmic resistance of the target or intended load such that power delivered through the driver outputs to a large extent is dissipated in the load and to a smaller extent in the individual on-resistances of the semiconductor switches as switch power loss.

When, as the H-bridge is conventionally operated, switches of legs A and D are closed and opened in a first phase and switches of legs C and B are opened and closed in an opposite, second, phase, in accordance the switching frequency. When the switching frequency is relatively high, for example larger than 100 kHz or larger than 1 MHz and the load has a significant inductive component, the H-bridge will change the load current in small quanta. Thus, load current tend to flow in the same direction during several periods of the switching frequency.

Figure 5:
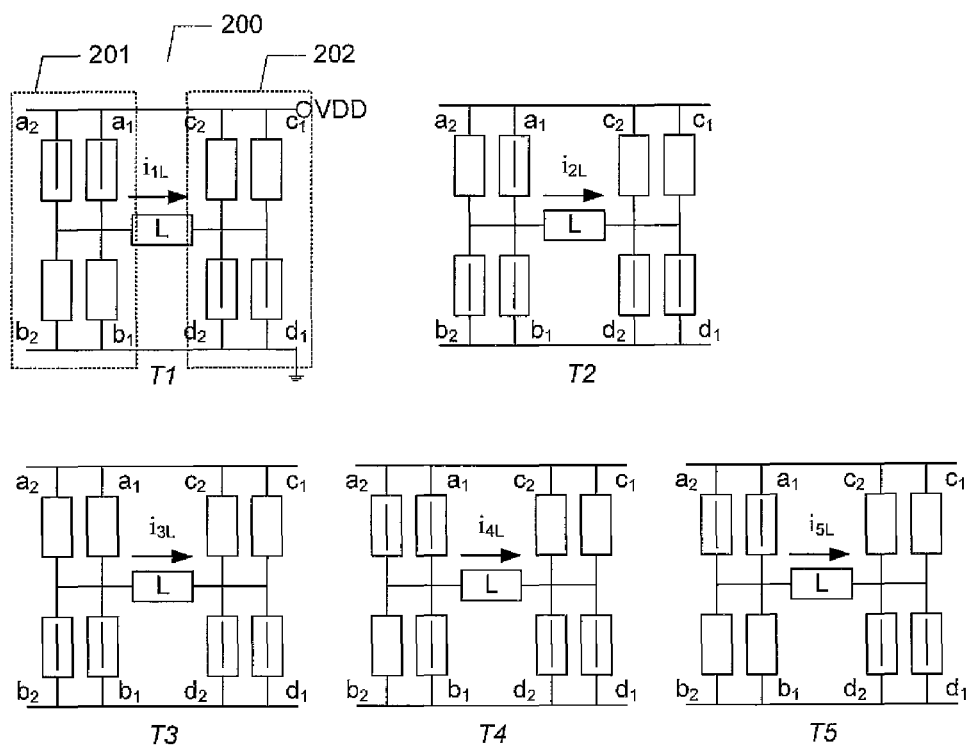
FIG. 5 illustrates schematically a timing sequence for a switching of individual sets and subsets of semiconductor switches in the H-bridge depicted in FIGS. 3 and 4 in accordance with the first embodiment of the invention.

FIG. 5 illustrates schematically a timing sequence for the switching of sets and subsets of semiconductor switches in each of the legs A and B of the H-bridge driver depicted on FIGS. 3 and 4 in accordance with a first embodiment of the invention. For the sake of simplicity, the right half-bridge (item 202 in FIG. 3) is maintained in a same state during the illustrated timing sequence where all semiconductor switches of leg C i.e. are open or off, and all semiconductor switches of leg D are closed. The right half H-bridge driver output is thus maintained at GND level in the present illustration. The current path preferably comprises a subset of the first and/or the second set of parellelly coupled semiconductor switches.

In accordance with the present first embodiment of the invention only semiconductor switches of a single subset, i.e. either $(b_1)$ or $(a_1)$, is closed during a state transition of the first driver output, $(V_{OUTL})$, and the selection of the closed subset is determined by a direction of the state transition of the first driver output, i.e. either from logic low to logic high or vice versa.

The respective control signals $(P1_A P2_A; P1_B P2_B$ on FIG. 3) of the left half H-bridge 201 are configured to provide an intermediate overlap state between alternating subsets $(a_1)$ or $(b_1)$ of the first set of semiconductor switches $(a_1 a_2)$ and the second set of semiconductor switches $(b_1 b_2)$. Semiconductor switches $(a_1)$ form a first or upper subset of the first set of semiconductor switches $(a_1 a_2)$ while $(b_1)$ form a second or lower subset of the second set of semiconductor switches $(b_1 b_2)$. The configuration or relative timing between control signals $P1_A$ and $P1_B P2_B$ is adapted to create the overlap time period wherein a current path is deliberately formed between the first and second power supply voltages through the upper and lower legs, A and B, respectively in connection with a driver output $(V_{OUTL})$ state transition from VDD to GND. This intermediate overlap state is schematically depicted as T2.

Likewise, the configuration or relative timing between control signals $P1_B$ and $P1_A P2_A$ is adapted to create another overlap time period wherein a current path is deliberately formed between the first and second power supply voltages through the upper and lower legs, A and B, respectively, in connection with a driver output $(V_{OUTL})$ state transition from GND to VDD. This intermediate overlap state is schematically depicted as T4.

However, the current paths formed during the subsequently overlap time periods have a well-defined duration set by the timing of respective control signals and a well-defined resistance dominated by the on-resistance of the upper subset $(b_1)$ or the lower subset $(a_1)$ of semiconductor switches depending on actual direction of the output state transition. Since the control signals $P1_A$ and $P1_B P2_B$ may conveniently be derived from common clock signal generator (not shown) the relative timing between control signals $P1_A$ and $P1_B P2_B$ can be controlled very accurately by establishing a synchronous relationship through appropriate control logic. The same naturally applies to the relative timing between control signals $P1_B$ and $P1_A P2_A$.

The timing sequence illustrated by drawings T1-T5 depicts the H-bridge 200 in different states during a cycle or period of the switching frequency. An open semiconductor switch is shown as a blank rectangle and a closed semiconductor switch is depicted a rectangle surrounding a vertical line. Current through the load at subsequent time instances is denoted $I_{1L}$, $I_{2L}$ etc.

During a first state T1, the first set of semiconductor switches $(a_1 a_2)$ of leg A is closed and the second set of semiconductor switches $(b_1 b_2)$ is open or off. The resulting flow of load current from the positive power supply voltage VDD to the negative supply voltage GND through the set of semiconductor switches $(d_1 d_2)$ of leg D is illustrated by $I_{1L}$.

During the second state T2, which correspond to an overlap state, only the upper subset of semiconductor switches $(a_1)$ of leg A is retained in closed or on state while subset $(a_2)$ is opened. The second or lower set of semiconductor switches $(b_1 b_2)$ of leg B is closed in the overlap state. Consequently, a current path or cross-conduction path is formed during an overlap time period in overlap state T2 between the first and second power supply voltages VDD and GND through subset $(a_1)$ and the lower set of semiconductor switches $(b_1 b_2)$. As previously described in connection with FIGS. 1 and 2, the on-resistance of the established current path between the power supply voltages $V_{DD}$ and GND is dominated by, and limited to, the approximately the on-resistance of subset $(a_1)$ because the latter on-resistance is about 5 times larger than the on-resistance of the lower set of semiconductor switches $(b_1 b_2)$ in the present embodiment of the invention.

At the start of the third state T3, the subset $(a_1)$ is finally opened to terminate the overlap state and corresponding time period while the lower set of semiconductor switches $(b_1 b_2)$ remains closed during state T3 completing a output state transition of the driver output by pulling it down to approximately GND level.

At the onset of a second overlap state T4, the upper set of semiconductor switches $(a_1 a_2)$ of leg A are closed again while subset $(b_1)$ of leg B are retained in closed or on state. Consequently, a current path or cross-conduction path is once again formed during the overlap time period of overlap state T4 through subset $(b_1)$ and the upper set of semiconductor switches $(a_1 a_2)$ of leg A, but this time in connection with a second state transition of the driver output from logic "low" to logic "high" (i.e. from the negative (GND) to the positive power supply voltage (VDD)) instead of vice versa during state T2.

Finally, at the onset of the fifth state T5, the semiconductor switches of subset $(b_1)$ are opened to terminate the second overlap state while the upper set of semiconductor switches $(a_1 a_2)$ of leg A remains closed so as to complete the second output state transition of the driver output and returning the H-bridge to the T1 state.

Consequently, the current paths formed during subsequent overlap time periods are a mechanism for the continuous existence of a resistive path between a power supply voltage and the inductive load current during state transitions of the driver output. Therefore, the load does not seek to establish alternative current paths through the parasitic substrate diodes associated with the CMOS semiconductor switches (as explained in connection with FIG. 2). Consequently, voltage spikes in the load voltage waveform at the driver output $(V_{OUTL})$ can be eliminated or attenuated and in general be shaped according to desired target response.

Figure 6:
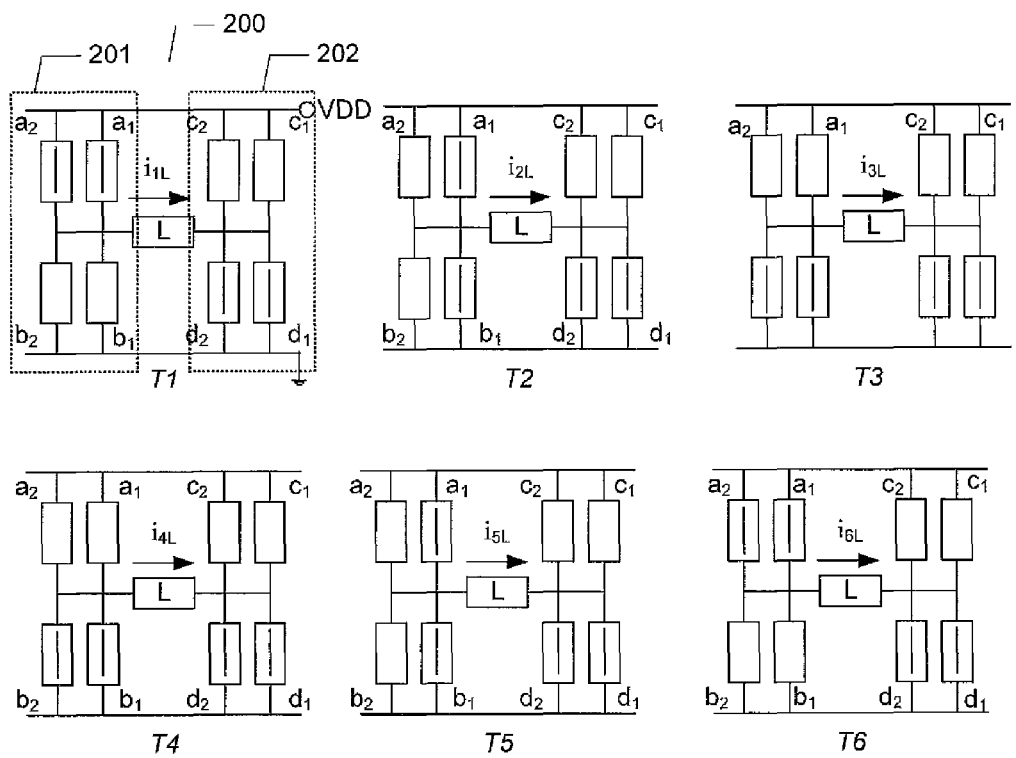
FIG. 6 illustrates schematically a timing sequence for a switching of individual sets and subsets of semiconductor switches of the H-bridge depicted in FIGS. 3 and 4 in accordance with a second embodiment of the invention, FIGS. 7a) and 7b) illustrate a number of driver output voltage waveforms in connection with output state transitions of the H-bridge depicted in FIGS. 3-5.

FIG. 6 illustrates schematically an alternative sequence of states T1-T6 for the switching of the respective sets and subsets of semiconductor switches in legs A and B of the H-bridge driver depicted in FIGS. 3 and 4 in accordance with a second embodiment of the invention. According to the present embodiment of the invention, during each state transition of the left driver output ($V_{OUTL}$) both subsets ($a_1$) and ($b_1$) of the upper and lower sets of semiconductor switches, respectively, are closed during the overlap time period and overlap state. The first driver output, $V_{OUTL}$, is accordingly forced towards midpoint voltage between the power supply voltages $V_{DD}$ and GND during the overlap time period if the on-resistance of subsets ($a_1$) and ($b_1$) is substantially identical, By appropriate scaling of the respective on-resistances of subsets ($a_1$) and ($b_1$) it is accordingly possible to force the first driver output, $V_{OUTL}$, towards any desired intermediate voltage value or any collection of intermediate voltage values between the power supply voltages $V_{DD}$ and GND if the ratio between on-resistances of subsets ($a_1$) and ($b_1$) is changed during the overlap time period by an appropriate settings of the respective control signals.

Figure 7A:
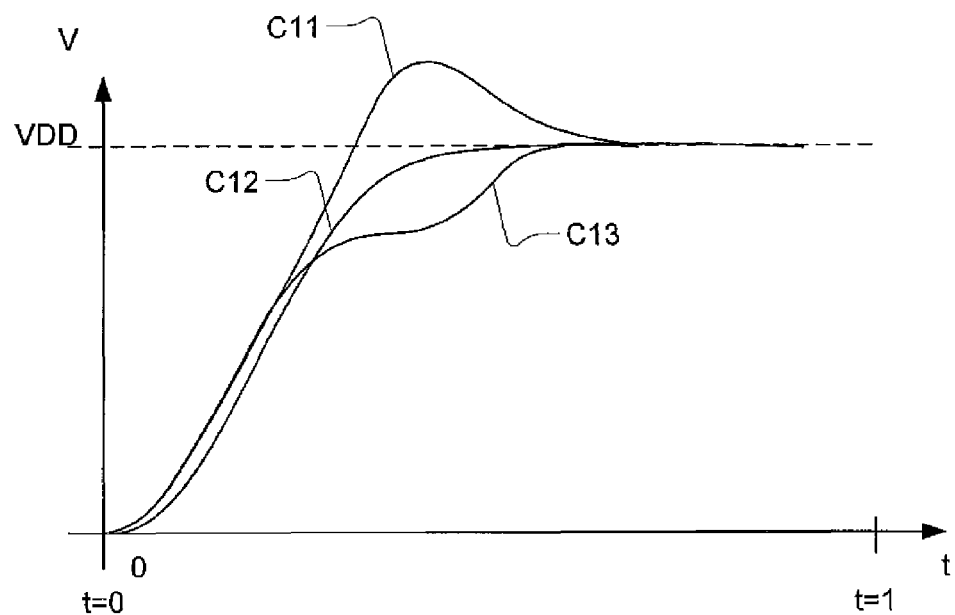
Figure 7B:
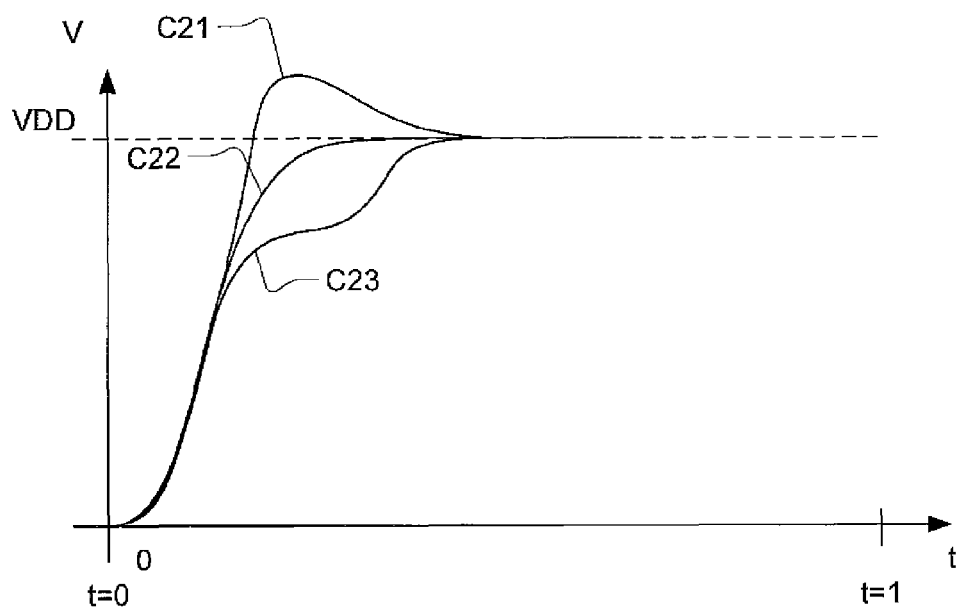

FIGS. 7a) and b) show respective collections of driver output voltage waveforms in connection with state transitions of the H-bridge driver output depicted in FIGS. 3 and 4. The driver output voltage waveforms show $V_{OUTL}$ during a positive going state transition of the driver output from GND to VDD. Time t=0 represents a point in time where the upper set of semiconductor switches ($a_1\ a_2$) of leg A is driven to a closed state from a previous open state by an appropriate setting of the control signals $P1_A\ P2_A$. The point in time indicated as t=1 represents a time where the driver output voltage $V_{OUTL}$ has reached a settled value close to the positive power supply voltage VDD.

The different output voltage waveforms depicted in FIGS. 7a) C11, C12 and C13 are obtained by adjusting characteristics of the respective control signals $P1_A\ P2_A$ to the upper set of semiconductor switches ($a_1\ a_2$) of leg A and $P1_B\ P2_B$ to the lower set of semiconductor switches of leg B. Since the characteristics of the respective control signals $P1_A\ P2_A$ and $P1_B\ P2_B$ control the duration of the overlap time period and/or the resistance through the cross-conduction path the degree of overshoot induced into the driver output voltage waveform can be controlled. The output voltage waveform depicted in C11, which has a large voltage spike rising to a level above the positive power supply voltage VDD, represents an overlap state where the on-resistance of the subset ($b_1$) is set to a high value for example by using a single (small CMOS switch) semiconductor. This has the effect that the on-resistance of the lower subset ($b_1$) is not quite low enough to prevent the formation of the parasitic substrate current. Oppositely, the output voltage waveforms depicted in C13 represents an overlap state where the on-resistance of subset ($b_1$) is set to a much lower value for example by using many CMOS switches or a large CMOS switch. The low on-resistance of the subset ($b_1$) seeks to pull the driver output voltage down towards GND while the upper set of semiconductor switches ($a_1\ a_2$) of leg A tries to pull the driver output voltage upwards to VDD. By choosing an appropriate on-resistance of the lower subset ($b_1$) relative to the on-resistance of the upper set of semiconductor switches ($a_1\ a_2$) desired driver output voltage waveforms can advantageously be achieved for example shaped as illustrated by C12 without noticeable overshoot or undershoot.

The different output voltage waveforms depicted in FIG. 6b) C21, C22 and C23 are also obtained by adjusting characteristics of the respective control signals, $P1_A\ P2_A$ to the upper set of semiconductor switches ($a_1\ a_2$) of leg A, and $P1_B\ P2_B$ to the lower set of semiconductor switches ($b_1\ b_2$) of leg B. However, in this situation, the output voltage waveform shaping is obtained by adjusting timing characteristics between the respective control signals $P1_A\ P2_A$ and $P1_B\ P2_B$ to control the duration of the overlap time period. The output voltage waveform depicted in C21, which has a large voltage spike rising to a level above the positive power supply voltage VDD, represents a very short duration of the overlap time period where the overlap time is not quite low enough to prevent an intermediate formation of the parasitic substrate current path. Oppositely, the output voltage waveforms depicted in C23 represents an overlap state where the overlap time period (where the lower subset of semiconductor switches ($b_1$) are closed) is much longer and the on-resistance of the lower subset ($b_1$) maintains to pull the driver output voltage down towards GND. Again, by choosing an appropriate duration of the overlap time a desired output voltage waveforms can be achieved for example as depicted by C22.

Figure 8:
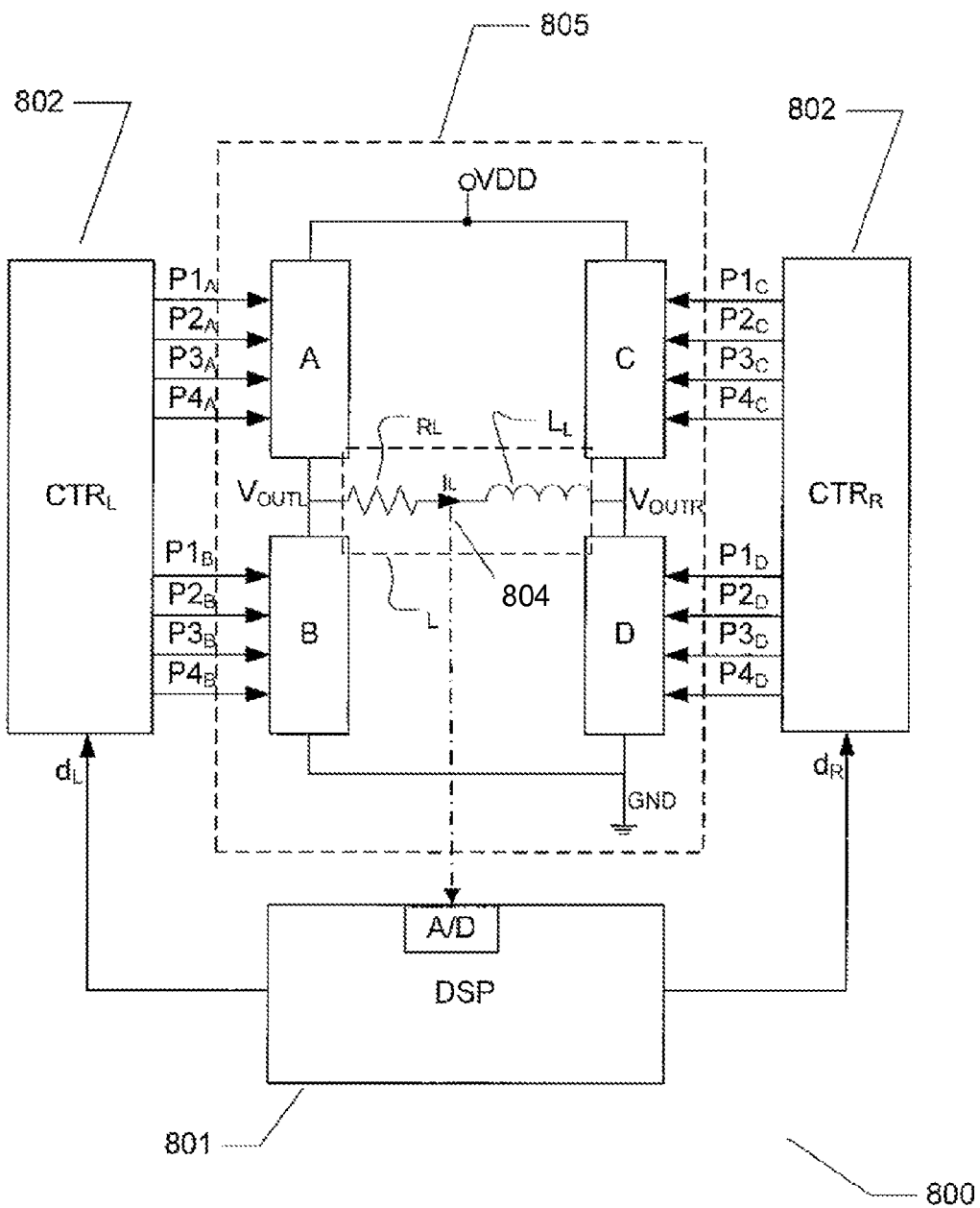
FIG. 8 is a schematic of an H-bridge driver circuit configured to provide adaptive control of characteristics of respective control signals to the semiconductor switches of an H-bridge in accordance with a third embodiment of the invention.

FIG. 8 illustrates schematically an H-bridge driver circuit 800 which includes a load current sensor 804. Sensed load currents are utilized to adaptively control characteristics of respective control signals to the respective sets of semiconductor switches of four legs of an H-bridge driver 805 in accordance with a second embodiment of the invention. A control circuit comprises a programmable Digital Signal Processor (DSP) 801 operatively coupled to a left switch control driver 802 and a right switch control driver 803. In the present embodiment, each of legs A-D of the H-bridge driver 805 comprises a set of semiconductor switches. Each set of semiconductor switches is furthermore composed of four subsets of semiconductor switches that are individually controllable through individual control signals supplied by the associated switch control driver. For example are control signals $P1_A\ P2_A\ P3_A\ P4_A$ of leg A individually controllable to provide individual and flexible, and preferably adaptive, control of the open or closed state of each subset of semiconductor switches associated with one of the control signals.

An electrical load, L, which may represent an audio loudspeaker, which includes a resistive component modelled by $R_L$ in series with significant inductive component modelled by inductor $L_L$ is coupled in-between two driver outputs $V_{OUTL}$ and $V_{OUTR}$ of the H-bridge driver 805. A current sensor 804 is operatively coupled to sense a dynamic load current supplied through a pair of driver outputs $V_{OUTL}$ and $V_{OUTR}$ to the load L. The current sensor may of course be adapted to directly or indirectly sense the load current for example by detecting a voltage across a small test impedance/resistor placed in series with the load L. The programmable DSP 801 comprises an A/D converter operatively coupled to the current sensor to detect an instantaneous load current and supply a sequence of digital samples or digital signal representing instantaneous load current to the DSP 801. A control program executed on the DSP 801 is adapted to filter the sequence of digital samples representing the instantaneous load current to form a band limited estimate of the load current inside a predetermined frequency range such as between 100 Hz and 10 kHz. Thereafter, the control program preferably proceeds by computing a running average of the load current over a time period between 20 μS and 5 mS such as between 50 μS and 5 mS depending on the electrical characteristics of the load and a switching frequency of the output signal across the load. Based on the computed running average of the load current an appropriate on-resistance of each, or at least some, of legs A-D is set during the overlap time periods by altering the number semiconductor switches of the relevant subset in connection with state transitions of the relevant driver output $V_{OUTL}$ or $V_{OUTR}$. In leg A, a relative timing between the control signals $P1_A\ P2_A\ P3_A\ P4_A$ is adapted in a manner which leads to a stepwise increase in the number of number semiconductor switches of the subset for increasing values of the detected running average of the load current. This control scheme leads to a stepwise decreasing on-resistance of the subset for increasing values of the running average of the load current. For decreasing values of the running average of the load current the relative timing between the control signals $P1_A$ $P2_A$ $P3_A$ $P4_A$ is adapted in an opposite manner which leads to a stepwise decrease in the number of subset that are closed during the overlap time period and consequently a stepwise increasing on-resistance of the subset. The timing between respective sets of control signals to the residual legs B, C and D are preferably adapted in a similar manner.

Figure 9:
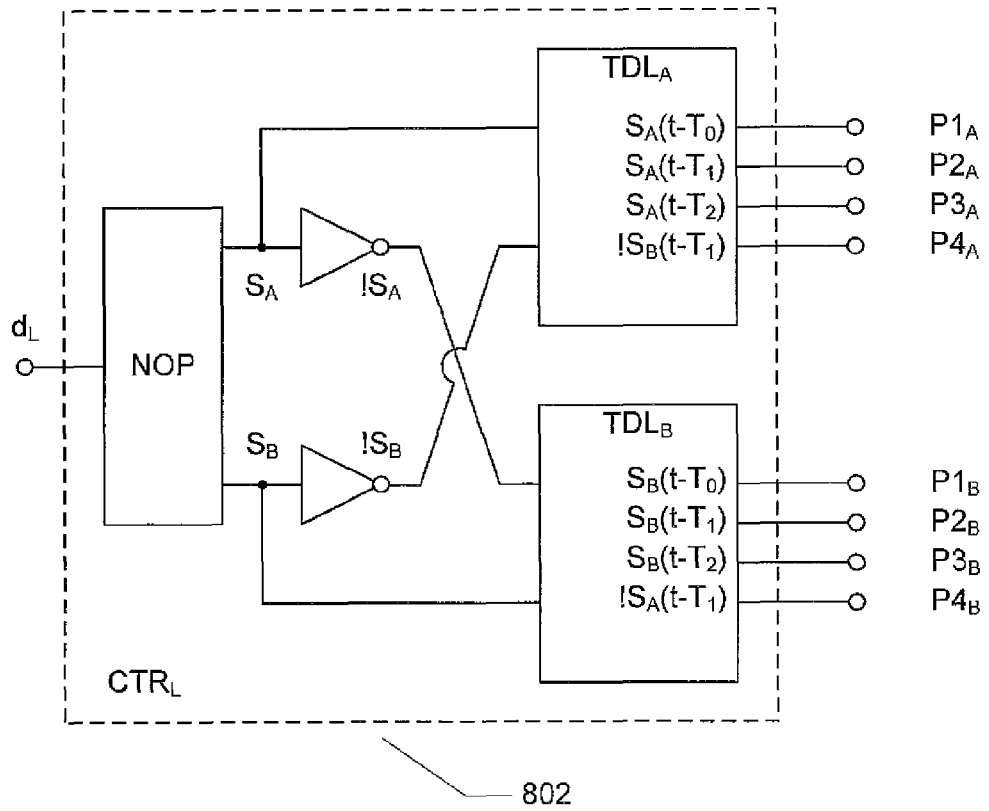
FIG. 9 is a block diagram of an exemplary non-overlapping clock and control signal generator for providing appropriate asynchronous control signals to the H-bridge driver circuit depicted in FIG. 8.

FIG. 9 shows a block diagram of the left switch control driver 802, $CRT_L$, depicted on FIG. 8. The left switch control driver 802 is configured to individually control subsets of semiconductor switches of the left half H-bridge, comprising legs A and B, of the H-bridge driver 805.

To control the full H-bridge 805 two such switch control drivers can be used as indicated in FIG. 8. The left switch control driver 802 comprises a digital input port adapted to receive a single bit input signal $d_L$ and provides two times four output signals in form of control signals $P1_A$, $P2_A$, $P3_A$, $P4_A$ and $P1_B$, $P2_B$, $P3_B$, $P4_B$ for individually controlling each of the four semiconductor switch subsets of legs A and B, respectively.

The left switch control driver 802 comprises a non-overlapping clock generator NOP that receives $d_L$ and outputs two digital single-bit signals $S_A$ and $S_B$ that are mutually 180 degrees out of phase to alternatingly provide a logic high '1' and low "0" and never provide a logic '1' at the same time during normal operation.

The two digital single-bit signals $S_A$ and $S_B$ may comprise modulated digital signals and are applied to tapped delay lines TDL-A and TDL-B, respectively. The tapped delay lines provides multiple control signals which corresponds to the modulated digital signals, but progressively delayed with predefined amounts of time $T_0$, $T_1$, $T_2$. Additionally, an inverted version $!S_B$ of the signal $S_B$ is provided to the tapped delay lines TDL-A, and likewise, an inverted version $!S_A$ of the signal $S_A$ is provided to the tapped delay lines TDL-B.

Signal $S_A$ as a function of time and delayed a period of time $T_0$ is written as $S_A(t-T_0)$ and is provided as a control signal $P1_A$ to a subset of switches of leg A of the H-bridge 805. Using a similar notation $S_A(t-T_1)$ is provided as a control signal $P2_A$, where $T_1$ is greater than $T_0$ and so forth for the other control signals. However, $P4_A$ is derived from $!S_B$.

Both for $S_A$ and $!S_B$ the tapped delay lines TDL-A can provide multiple output signals which corresponds to the signal input to the tapped delay lines, but delayed a predefined amount of time $T_0$, $T_1$, $T_2$. This applies for both tapped delay lines. Each of the tapped delay lines TDL-A and TDL-B can be implemented by a series of logic gates designed to provide a delay of a predefined amount of time. The signals input to the tapped delay lines are each input to such a series of logic gates and delayed versions of the input signals are generated from the interconnections of gates in the series. The gates can be individually configured to give a predefined delay, within a range. Longer delays can be implemented by a series of gates.

In this way asynchronous versions of the left and right switch control drivers 802 can be implemented. Alternatively, a synchronous controller can be implemented so that synthesized control signals $P1_A$, $P2_A$, $P3_A$ and $P4_A$ are delayed replicas of each other but where the relative time delays are set by a common clock signal. The same naturally applies to $P1_B$, $P2_B$, $P3_B$ and $P4_B$. The clock signal(s) to which control signals $P1_A$, $P2_A$, $P3_A$ and $P4_A$ and $P1_B$, $P2_B$, $P3_B$ and $P4_B$ are synchronised may be derived from a timing of the digital signals $d_L$ and $d_R$.

Figure 10:
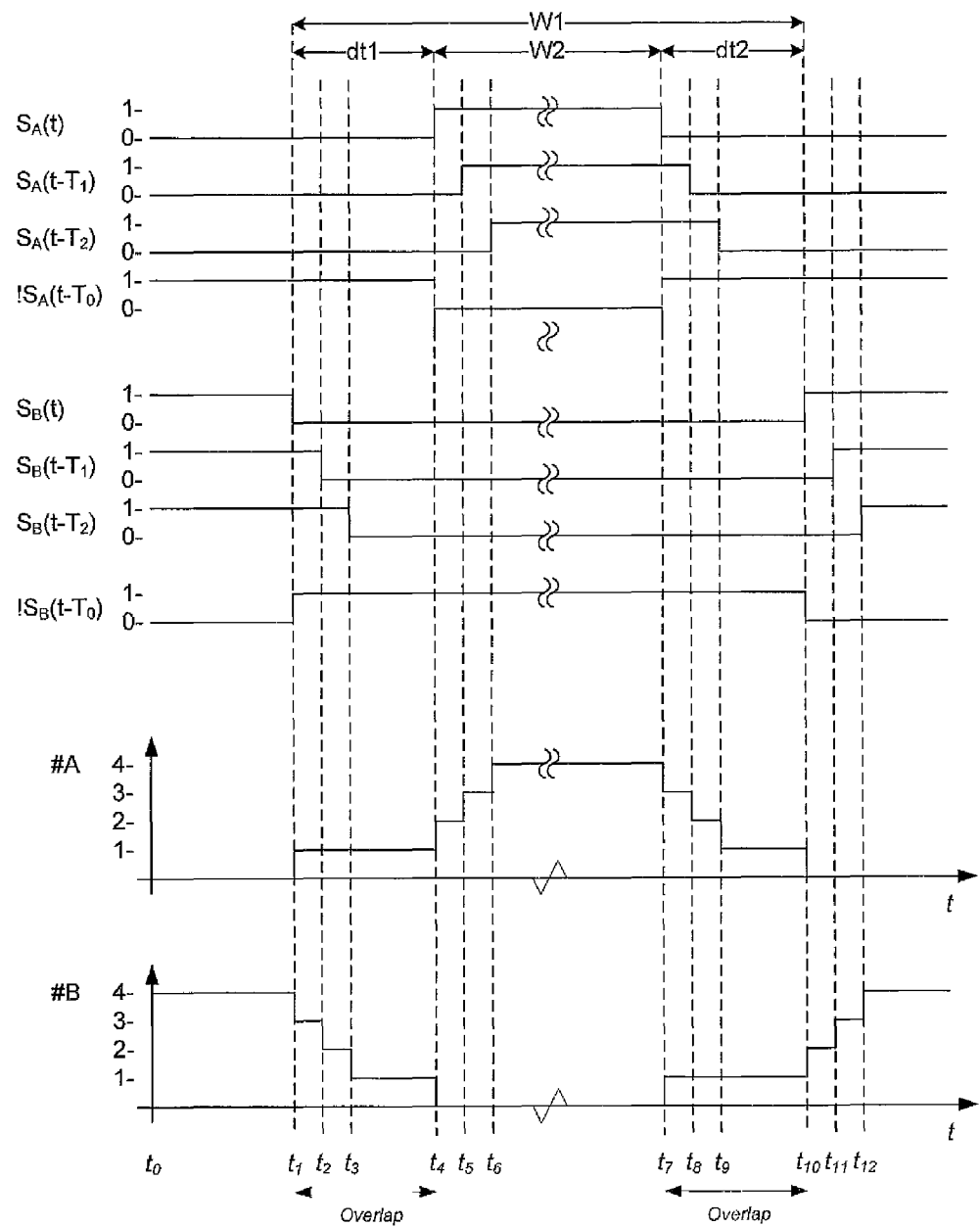
FIG. 10 is a timing diagram illustrating timing relationships between respective control signals supplied to subsets of semiconductor switches of a half H-bridge driver in accordance with a fourth embodiment of the invention.

FIG. 10 shows timing of respective sets of control signals applied by left switch control driver 802 to legs A and B of the of H-bridge driver (805 on FIG. 8) in accordance with a third embodiment of the invention. The two lower diagrams illustrate how many subsets of semiconductor switches that are closed or turned on at a given point in time for each of set of semiconductor switches in leg A and leg B. Using the previously established notation of $S_A$, $!S_A$, $S_B$ and $!S_B$ as a function of time minus a delay amount, the control signals are shown as a function of time.

The control signal $S_A(t)$ is logic high or "1" from $t_4$ to $t_7$ and control signal $S_B(t)$ is logic high before $t_1$ and after $t_{10}$. The time periods from $t_1$ to $t_4$ and $t_7$ to $t_{10}$ are so-called blanking periods set by the non-overlapping clock generator. $S_A(t)$ and $S_B(t)$ controls switches of the legs A and B. Conventionally, this dead-time ensures that the power supply is not short-circuited.

However, the other control signals also controls groups of switches. $S_A(t-T_1)$ and $S_A(t-T_2)$ illustrates that two further groups of switches are on during equally lasting periods of time, but during shifted periods of time. The same situation is shown for $S_B(t-T_1)$ and $S_B(t-T_2)$. An additional control signal to leg A is provided by an inverted and delayed version of $S_B(t)$.

The two lower graphs with their axes denoted #A and #B shows respective curves representing the number of subsets that are closed at a given point in time. As illustrated the timing of the control signals is configured so as to create two distinct overlap time periods where there exist several different overlap states inside each overlap time period. A first overlap period is extending from $t_1$ to $t_4$ and a second overlap period is extending from $t_7$ to $t_{10}$. Furthermore, the timing between the control signals $P1_A$, $P2_A$, $P3_A$ and $P4_A$ is configured so as to create a set of progressively delayed control signals. As illustrated by curve #A after the end of the first overlap time period from $t_1$ to $t_4$, a stepwise increasing number of subsets of semiconductor switches is closed in leg A from $t_4$ to $t_6$, and correspondingly for leg B after the end of the second overlap time period. The duration of the overlap time periods such as the first illustrated overlap period from $t_1$ to $t_4$ is preferably set to a value between 0.5 nS and 50 nS such as between 2 nS and 20 nS.

The invention claimed is:

1. A sound reproducing assembly, comprising:
a digital audio signal generator;
a pulse-width modulation (PWM) or pulse-density modulation (PDM) modulator operatively coupled to the digital audio signal generator and adapted to provide modulated digital signals;
a driver circuit having a control circuit operatively coupled for receipt of the modulated digital signals, the driver circuit including:
a first driver including an upper leg coupled between a first power supply voltage and a first driver output and a lower leg coupled between the first driver output and a second power supply voltage,
the upper leg including a first set of parellelly coupled semiconductor switches controlled by respective control signals of a first set of control signals,
the lower leg including a second set of parellelly coupled semiconductor switches controlled by respective control signals of a second set of control signals,
the control circuit being configured to generate the first and second sets of control signals for the first and second sets of parellelly coupled semiconductor switches, respectively, to create a current path through the upper and lower legs during an overlap time period between state transitions of the first driver output; and an electroacoustical loudspeaker electrically coupled to the first driver output and one of the first and second power supply voltages, or electrically coupled in-between the first driver output and the second driver output.

2. The sound reproducing assembly of claim 1, wherein the current path includes a subset of the first or second sets of parellelly coupled semiconductor switches.

3. The sound reproducing assembly of claim 1, wherein the current path includes alternating subsets of the first and second sets of parellelly coupled semiconductor switches in accordance with state transitions of the first driver output.

4. The sound reproducing assembly of claim 1, wherein the current path includes a subset of the first set of parellelly coupled semiconductor switches and a subset of the second set of parellelly coupled semiconductor switches for each state transition of the first driver output.

5. The sound reproducing assembly of claim 1, wherein the control circuit is adapted generate the first set of control signals as progressively delayed control signals and the second set of control signals as progressively delayed control signals for the second set of parellelly coupled semiconductor switches.

6. The sound reproducing assembly of claim 2, wherein at least one of:
an on-resistance of the subset of the first set of parellelly coupled semiconductor switches is between 1 and 30% of an on-resistance of the first set of parellelly coupled semiconductor switches, or
an on-resistance of the subset of the second set of parellelly coupled semiconductor switches is between 1 and 30% of an on-resistance of the second set of parellelly coupled semiconductor switches.

7. The sound reproducing assembly of claim 1, wherein a timing scheme of the first and second sets of control signals is configured to set a duration of the overlap time period to at least one of: between 0.5 nanoseconds and 50 nanoseconds, between 1 and 20 nanoseconds, or between 2 and 10 nanoseconds.

8. The sound reproducing assembly of claim 2, wherein at least one of:
the subset of the second set of parellelly coupled semiconductor switches is formed by a single semiconductor switch, or
the subset of the first set of parellelly coupled semiconductor switches is formed by a single semiconductor switch.

9. The sound reproducing assembly of claim 1, wherein at least one of:
the first set of parellelly coupled semiconductor switches comprises semiconductor switches with different on-resistances, or
the second set of parellelly coupled semiconductor switches comprises semiconductor switches with different on-resistances.

10. The sound reproducing assembly of claim 9, wherein at least one of:
the first set of parellelly coupled semiconductor switches comprises two or more semiconductor switches with binary weighted on-resistances, or
the second set of parellelly coupled semiconductor switches comprises two or more semiconductor switches with binary weighted on-resistances.

11. The sound reproducing assembly of claim 1, wherein the first or second sets of parellelly coupled semiconductor switches comprises a transistor switch selected from a group including Field Effect Transistors (FETs), Bipolar Transistors (BJTs), and Insulated Gate Bipolar Transistors (IGBTs).

12. The sound reproducing assembly of claim 1, further comprising:
a sensor operatively coupled to sense a load current supplied through the first driver output,
the control circuit being operatively coupled to the sensor and adapted to change characteristics of the respective control signals to the first and second sets of parellelly coupled semiconductor switches in accordance with sensed values of the load current.

13. The sound reproducing assembly of claim 12, wherein the control circuit is adapted to control at least one of: on-resistance of the subset of the first set of parellelly coupled semiconductor switches, or on-resistance of the second set of parellelly coupled semiconductor switches during the overlap time period.

14. The sound reproducing assembly of claim 13, wherein the on-resistances are controlled by at least one of:
altering a number of a semiconductor switches of the subset of the first set of parellelly coupled semiconductor switches, or
altering a number of a semiconductor switches of the subset of the second set of parellelly coupled semiconductor switches.

15. The sound reproducing assembly of claim 12, wherein the control circuit is adapted to change the duration of the overlap time period.

16. The sound reproducing assembly of claim 12, wherein the control circuit is adapted to sense the load current in at least a portion of an audio frequency range between 20 Hz and 20 kHz.

17. The sound reproducing assembly of claim 1, further comprising:
a second driver including an upper leg coupled between the first power supply voltage and a second driver output and a lower leg coupled between the second driver output and the second power supply voltage,
the upper leg including a third set of parellelly coupled semiconductor switches controlled by respective control signals of a third set of controls supplied by the
the lower leg including a fourth set of parellelly coupled semiconductor switches controlled by respective control signals of a fourth set of control signals supplied by the control circuit,
wherein the control circuit is further adapted to generate the respective control signals for the third and fourth sets of parellelly coupled semiconductor switches to create a current path through the upper and lower legs during an overlap time period between state transitions of the second driver output.

18. The sound reproducing assembly of claim 1, wherein the control circuit includes a Digital Signal Processor.

19. The sound reproducing assembly of claim 1, wherein a DC voltage difference between the first and second power supply voltages lies between 1.8 Volt and 5.0 Volt during operation of the driver circuit.

* * * * *